United States Patent
Zarikian et al.

(10) Patent No.: US 8,024,263 B2
(45) Date of Patent: Sep. 20, 2011

(54) MACROECONOMIC-ADJUSTED CREDIT RISK SCORE SYSTEMS AND METHODS

(75) Inventors: Lisa Zarikian, Alpharetta, GA (US); John Zippe, Newark, DE (US); Natalia Micheloud, Suwanee, GA (US)

(73) Assignee: Equifax, Inc., Atlanta, GA (US)

( * ) Notice: Subject to any disclaimer, the term of this patent is extended or adjusted under 35 U.S.C. 154(b) by 0 days.

(21) Appl. No.: 12/689,288

(22) Filed: Jan. 19, 2010

(65) Prior Publication Data

US 2010/0145847 A1 Jun. 10, 2010

Related U.S. Application Data

(63) Continuation of application No. 11/937,256, filed on Nov. 8, 2007, now Pat. No. 7,653,593.

(51) Int. Cl.
*G06Q 40/00* (2006.01)
(52) U.S. Cl. ............ 705/38; 705/39; 235/370; 345/418; 455/556
(58) Field of Classification Search .................... 705/36, 705/39; 235/80; 345/55, 418, 440
See application file for complete search history.

(56) References Cited

U.S. PATENT DOCUMENTS

| | | | |
|---|---|---|---|
| 5,262,941 A | 11/1993 | Saladin et al. | |
| 5,274,547 A | 12/1993 | Zoffel et al. | |
| 5,696,907 A | 12/1997 | Tom | |
| 5,732,400 A | 3/1998 | Mandler et al. | |
| 6,185,543 B1 | 2/2001 | Galperin et al. | |
| 6,202,053 B1 | 3/2001 | Christiansen et al. | |
| 6,311,169 B2 | 10/2001 | Duhon | |
| 6,405,181 B2 | 6/2002 | Lent et al. | |
| 6,658,393 B1 | 12/2003 | Basch et al. | |
| 6,871,181 B2 * | 3/2005 | Kansal | 705/4 |
| 7,031,936 B2 | 4/2006 | Johnson et al. | |
| 7,191,150 B1 * | 3/2007 | Shao et al. | 705/38 |
| 7,251,624 B1 * | 7/2007 | Lee et al. | 705/35 |
| 7,280,980 B1 * | 10/2007 | Hoadley et al. | 705/38 |
| 7,305,351 B1 * | 12/2007 | Bechhofer et al. | 705/7 |
| 7,305,364 B2 * | 12/2007 | Nabe et al. | 705/37 |
| 7,310,618 B2 | 12/2007 | Libman | |
| 7,409,365 B1 * | 8/2008 | Hood | 705/35 |
| 7,627,513 B2 * | 12/2009 | Kolos et al. | 705/36 R |
| 7,822,665 B2 * | 10/2010 | Haggerty et al. | 705/35 |
| 7,840,484 B2 * | 11/2010 | Haggerty et al. | 705/38 |
| 2001/0044766 A1 * | 11/2001 | Keyes | 705/36 |
| 2002/0013752 A1 * | 1/2002 | Johnson et al. | 705/36 |
| 2002/0019790 A1 * | 2/2002 | Edgar et al. | 705/36 |
| 2002/0032585 A1 * | 3/2002 | Keyes | 705/4 |
| 2002/0049653 A1 * | 4/2002 | Johnson et al. | 705/35 |

(Continued)

OTHER PUBLICATIONS

Esther Mohr and Gunter Schmidt, Trading Financial Markets with Online Algorithm, Operations Research 2008 (Online Algorithm).*

(Continued)

*Primary Examiner* — Ella Colbert
*Assistant Examiner* — Chika Ojiaku
(74) *Attorney, Agent, or Firm* — Alston & Bird, LLP

(57) ABSTRACT

Various embodiments of the present invention provide systems and methods for automatically compensating an individual's credit risk score for macroeconomic data. In particular, various embodiments provide systems and methods to determine a macroeconomic risk score. In addition, various embodiments provide systems and methods to determine an adjusted credit risk score for an individual based on the individual's credit risk score and a macroeconomic risk score that serves as a scale adjuster to keep overall delinquency and/or loss rates in line as economic factors change.

22 Claims, 7 Drawing Sheets

U.S. PATENT DOCUMENTS

| | | | |
|---|---|---|---|
| 2002/0049659 A1* | 4/2002 | Johnson et al. | 705/37 |
| 2002/0052766 A1* | 5/2002 | Dingman et al. | 705/7 |
| 2002/0052815 A1* | 5/2002 | Johnson et al. | 705/36 |
| 2002/0052836 A1 | 5/2002 | Galperin et al. | |
| 2002/0059126 A1* | 5/2002 | Ricciardi | 705/36 |
| 2002/0062238 A1* | 5/2002 | Brilando | 705/7 |
| 2002/0116236 A1* | 8/2002 | Johnson et al. | 705/7 |
| 2002/0116309 A1* | 8/2002 | Keyes et al. | 705/36 |
| 2002/0128953 A1* | 9/2002 | Quallen et al. | 705/37 |
| 2002/0194119 A1 | 12/2002 | Wright et al. | |
| 2003/0093347 A1* | 5/2003 | Gray | 705/35 |
| 2003/0110112 A1* | 6/2003 | Johnson et al. | 705/36 |
| 2003/0115129 A1* | 6/2003 | Feaver et al. | 705/37 |
| 2003/0149657 A1* | 8/2003 | Reynolds et al. | 705/38 |
| 2003/0212618 A1* | 11/2003 | Keyes et al. | 705/35 |
| 2003/0212643 A1* | 11/2003 | Steele et al. | 705/400 |
| 2003/0229580 A1* | 12/2003 | Gass et al. | 705/38 |
| 2003/0233325 A1* | 12/2003 | Belyi | 705/42 |
| 2004/0015375 A1 | 1/2004 | Cogliandro | |
| 2004/0039619 A1* | 2/2004 | Zarb | 705/7 |
| 2004/0054563 A1* | 3/2004 | Douglas | 705/7 |
| 2004/0078319 A1* | 4/2004 | Madhavan et al. | 705/38 |
| 2004/0267657 A1* | 12/2004 | Hecht | 705/37 |
| 2005/0027645 A1* | 2/2005 | Lui et al. | 705/38 |
| 2005/0130704 A1* | 6/2005 | McParland et al. | 455/556.2 |
| 2005/0262013 A1 | 11/2005 | Guthner et al. | |
| 2006/0100950 A1* | 5/2006 | Hecht | 705/37 |
| 2006/0212386 A1* | 9/2006 | Willey et al. | 705/38 |
| 2006/0271470 A1 | 11/2006 | McNamar et al. | |
| 2007/0050289 A1 | 3/2007 | Zeller et al. | |
| 2007/0112668 A1* | 5/2007 | Celano et al. | 705/38 |
| 2007/0124236 A1 | 5/2007 | Grichnik et al. | |
| 2007/0156576 A1 | 7/2007 | Imrey et al. | |
| 2007/0214076 A1 | 9/2007 | Robida et al. | |
| 2007/0255645 A1 | 11/2007 | Morris et al. | |
| 2007/0255646 A1 | 11/2007 | Morris et al. | |
| 2008/0077457 A1 | 3/2008 | Pannatier et al. | |
| 2009/0177589 A1* | 7/2009 | Edgar et al. | 705/36 R |

OTHER PUBLICATIONS

How credit scores work, how a score is calculated, www.bankrate.com, Updated Nov. 8, 2006 (Calculate).*

International Search Report for PCT/US 08/10991, dated Mar. 27, 2009.

Equifax Business Failure Risk Score, www.equifax.com, Last Revised Mar. 2007 (Equifax).

Christian, Margena A., Piggybacking: boosting credit score bucks could end in Sep., Jet, Jul. 9, 2007.

Meder, Dan, Benchmarking and blending: keeping watch on both details and the big picture, Mar. 2, 2008, Business Credit.

* cited by examiner

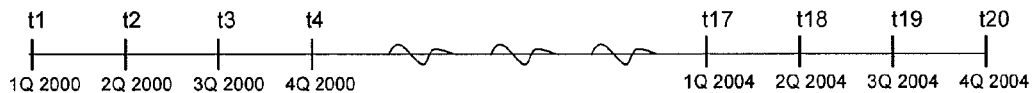
FIGURE 3: Sample of Consumers
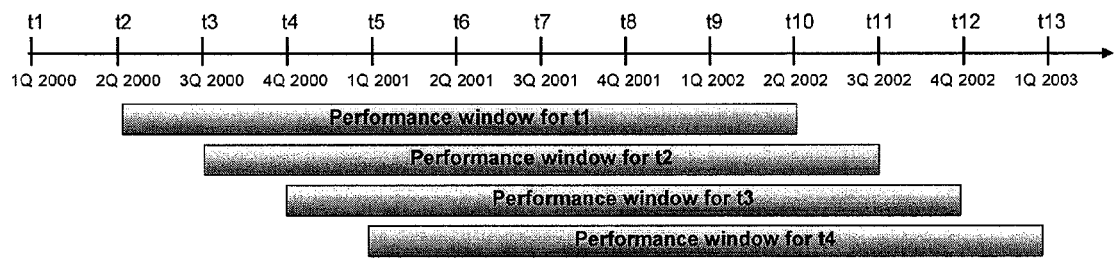
FIGURE 4a: Individual Performance over a Window of Time
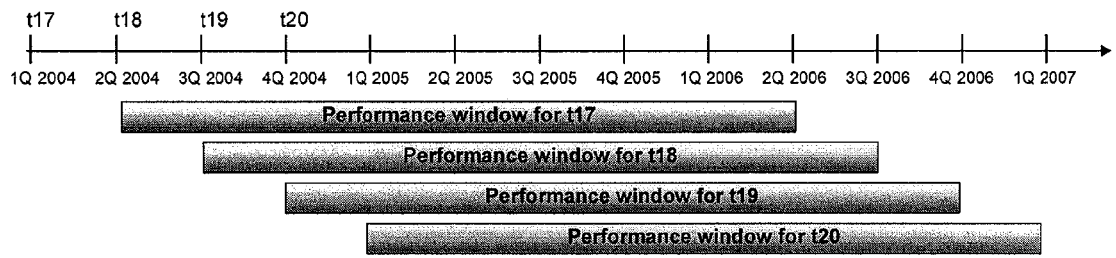
FIGURE 4b: Individual Performance over a Window of Time

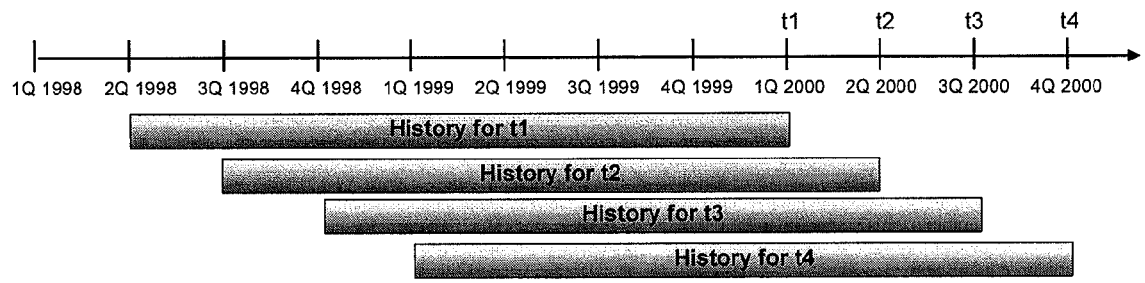
FIGURE 5: Past History of Econometric Factors
|  | | Lender's Custom Risk Score | | |
|---|---|---|---|---|
|  | | Min - 500 | 501 - 700 | 701 - Max |
| Macroeconomic Risk Score | 701 - Max | Approve, deposit required | Approve | Approve |
| | 501 - 700 | Decline | Approve | Approve |
| | Min - 500 | Decline | Approve, deposit required | Approve |
FIGURE 6: Matrix

MACROECONOMIC-ADJUSTED CREDIT RISK SCORE SYSTEMS AND METHODS

CROSS-REFERENCE TO RELATED APPLICATIONS

The present application is a Continuation of U.S. application Ser. No. 11/937,256, filed Nov. 8, 2007, now U.S. Pat. No. 7,653,593, and titled "Macroeconomic-Adjusted Credit Risk Score Systems and Methods", the disclosure of which is incorporated herein by reference in its entirety.

BACKGROUND OF THE INVENTION

1. Field of Invention

The disclosed invention generally pertains to the field of credit risk scores, and more specifically, to a system and method for automatically compensating an individual's credit risk score for macroeconomic data.

2. Description of the Related Art

In the United States, a credit risk score, or simply credit score, represents the creditworthiness of an individual. Lenders, such as banks and credit card companies, use an individual's credit score to evaluate the potential risk of lending money to the individual. In other words, lenders will use credit scores to determine who qualifies for a loan, at what interest rate and credit limits, and who does not.

The most widely known credit score in the United States is the Fair Isaac Corporation score (FICO). This score is calculated by applying statistical methods and data analysis, developed by Fair Isaac, to information in an individual's credit file and will range from 300 to 850. In addition, there are three major credit reporting agencies, Equifax, Experian, and TransUnion, who are often referred to as the "credit bureaus" and also calculate their own credit scores. Credit scores for the same individual will differ among the three agencies due to the statistical methods employed by each agency, what information is used, and what weight is given to the information.

In 2006, the credit bureaus introduced VantageScore® (registered trademark of VantageScore Solutions, LLC, Wilmington, Del.) to provide an alternative to the traditional scores discussed above. VantageScore uses a different range than the traditional FICO score, i.e., 501 to 990. An individual's VantageScore® may still differ from agency to agency; however, this difference is not due to the credit score model but due to differences in how information is reported to and stored at the three agencies.

The goal of any credit score model is to be able to identify as many people as possible who are good credit risks and eliminate those who are bad credit risks. Thus, the value of a credit score to lenders is its ability to predict an individual's future creditworthiness. Typically, the information that is used to calculate an individual's credit score is account information, such as credit cards, automobile loans, student loans, and mortgages, public records, such as tax liens and bankruptcies, and inquires, such as requests by lenders to view the individual's credit. In addition, various factors are considered and weighted such as punctuality of payment in the past, the amount of debt, length of credit history, types of credit used, and recent search for credit and/or amount of credit obtained recently.

However, a problem that exists with traditional risk scores is over time they tend to lose accuracy due to macroeconomic changes. As a result, lenders, who have determined that 5% of individuals with a score of 500 will default on a loan, for example, will discover that due to a decline in the economy, they need to adjust the score to 550 in order not to accept greater risk. Therefore, lenders must validate the performance and distribution of their model on a regular basis and adjust strategies and/or develop their model on a regular basis in order to compensate for economic changes in the use of credit risk models for decision purposes. This is time and resource intensive, both from the standpoint of performing the analysis, e.g., collecting historical data and running the analysis to interpret the validation results, and from an operational standpoint, e.g., changing score cut offs or embedding new scores in existing processes and training personnel to understand the new policy. In addition, while distributions can be run on the current economic cycle, validations by definition require looking at scores over a historical time frame. In other words, validations require looking at the economic conditions at the time when individuals, who have defaulted on a loan, applied for the loan. Therefore, the current economic cycle is not applicable.

Thus, a need exists to provide a mechanism by which the model can essentially adjust for current economic conditions, in which the adjustment is based on correlated econometric factors determined by analysis of the historical impact of these factors on score distributions and performance. Such an automatic adjustment will allow model strategies to keep pace with economic changes without requiring lenders to validate the performance and distribution of the model and adjust strategies and/or develop the model as frequently as otherwise.

BRIEF SUMMARY OF THE INVENTION

Various embodiments of the present invention provide systems and methods for determining an adjusted credit risk score. In particular, various embodiments provide systems and methods for adjusting an individual's credit risk to account for macroeconomic data. Such embodiments involve determining a macroeconomic risk score based on macroeconomic data, obtaining the individual's credit risk score, and determining the individual's adjusted credit risk score by developing a model that will automatically compensate the individual's credit risk score by utilizing the macroeconomic risk score.

In particular, according to various embodiments of the invention, a method for determining an individual's adjusted credit risk score comprises the steps of: (a) determining a macroeconomic risk score based on macroeconomic data; (b) obtaining an individual's credit risk score; (c) developing a model to automatically compensate the individual's credit risk score by utilizing the macroeconomic risk score; and (d) outputting the individual's adjusted credit risk score by utilizing the model. In various embodiments, the model may be implemented by a computer.

In various embodiments of the invention, the individual's adjusted credit risk score is utilized in order to offer credit to the individual based on the individual's adjusted credit risk score. In addition, in various embodiments of the invention, the model used to determine the individual's adjusted credit risk score may comprise evaluating the macroeconomic risk score and the individual's credit risk score using a matrix composed of macroeconomic risk scores and unadjusted credit risk scores. In other embodiments, the model is developed via a statistical technique.

In addition, according to various embodiments of the invention, the step of determining the macroeconomic risk score further comprise: (1) obtaining a sample of consumer credit data over a period of time covering multiple economic conditions; (2) determining individual performance for each consumer represented in the sample of consumer credit data over a window of time based on their credit data, wherein the individual performance is utilized as a dependent attribute; (3) obtaining one or more econometric factors, wherein the one or more econometric factors are utilized as one or more independent attributes; and (4) determining the macroeconomic risk score by utilizing the dependent attribute, the one or more independent attributes, and applying a statistical technique for modeling. In various embodiments, these steps may be implemented by a computer.

Numerous statistical techniques for modeling are employed among various embodiments of the invention in order to determine the macroeconomic risk score, for example, logistic regression or other nonlinear techniques that use a neural network, decision tree, or score fusion. The period of time over which the sample of consumer credit data is collected may vary from embodiment to embodiment. For example, in one embodiment the period of time comprises a five-year period. In addition, the window of time over which individual performance is determined may vary from embodiment to embodiment. For example, the window of time is twenty-four months for one embodiment and only twelve months for another embodiment.

In addition, individual performance in various embodiments can be based on numerous parameters, such as whether a consumer had an account ninety-plus days past due, a charge-off, or a bankruptcy during the window of time. Also, in various embodiments, the one or more econometric factors can comprise data series such as inflation rate, unemployment rate, and consumer confidence level. In other embodiments, econometric factors can comprise or include aggregating data series as well, such as number of open trades, average credit limit, and average credit card balance, at a level of geography, demographic segment, or both. The level of geography, for example, may be zip code, metropolitan statistical area ("MSA"), or census region, while the demographic segment may be based on a grouping, such as income. Other various embodiments also involve determining ratios based on the econometric factors and using these ratios as independent attributes.

In addition, several embodiments utilize a weighting scheme to weight data in a development sample that includes the sample of consumer credit data and the econometric factors. In one such embodiment, the econometric factors are obtained at a level of geography and the weighting scheme is based on the number of consumers in each level of geography so that the development sample comprises one observation per each level of geography and observation point, and each observation is given a weight equal to the number of consumers in that level of geography. In another embodiment, the econometric factors are obtained at a level of geography and the weighting scheme is based on building the development sample by including an observation for each consumer in each level of geography and each consumer is given an equal weight. While in another embodiment, the weighting scheme is simply based on the level of geography and each level of geography is weighted equally.

Furthermore, various embodiments of the invention provide a system for determining an individual's adjusted credit risk score in which the system comprises a processor adapted to execute a macroeconomic risk score module and a risk model adjustment module and a memory coupled to the processor and adapted for storing the macroeconomic risk score module and the risk model adjustment module. The macroeconomic risk score module is adapted for obtaining a macroeconomic risk score. While the risk model adjustment module is adapted for determining the individual's adjusted credit risk score by obtaining the individual's credit risk score and automatically compensating the individual's credit risk score by utilizing the macroeconomic risk score.

In various embodiments, the risk model adjustment module determines the individual's adjusted credit risk score based on a matrix composed of macroeconomic risk scores and unadjusted credit risk scores. In other embodiments, the risk model adjustment module determines the individual's adjusted credit risk score based on a model developed via a statistical technique.

The risk model adjustment module may be further adapted to archive the individual's adjusted credit risk score to a database in various embodiments. In addition, in other embodiments, the risk model adjustment module further determines whether to offer the individual credit based on the individual's adjusted credit risk score and outputs the decision.

In various embodiments, the macroeconomic risk score module simply obtains the macroeconomic risk score from various sources. In other embodiments, the macroeconomic risk score module further comprises obtaining a sample of consumer credit data over a period of time covering multiple economic conditions, obtaining a performance determination for each of the consumers in the sample over a window of time to be utilized as a dependent attribute, obtaining one or more econometric factors to be utilized as one or more independent attributes, and calculating the macroeconomic risk score by utilizing the dependent attribute, the one or more independent attributes, and applying a statistical technique for modeling.

In the various embodiments of the macroeconomic risk score module that calculates the macroeconomic risk score, the module may employ numerous statistical techniques for modeling in order to determine the macroeconomic risk score. For example, the module may use techniques such as logistic regression or other nonlinear techniques that use a neural network, decision tree, or score fusion. In addition, the period of time over which embodiments of the macroeconomic risk score module obtains the consumer credit data and the window of time over which embodiments of the macroeconomic risk score module obtains a performance determination for each consumer in the sample may vary from embodiment to embodiment. For example, in one embodiment the period of time comprises a five-year period, while in other embodiments the window of time is twenty-four months or twelve months.

In addition, in the various embodiments of the macroeconomic risk score module that calculates the macroeconomic risk score, the module can use several different parameters to determine individual performance, such as whether a consumer had an account ninety-plus days past due, a charge-off, or a bankruptcy during the window of time. In various embodiments, the one or more econometric factors utilized by the macroeconomic risk score module can comprise data series, such as inflation rate, unemployment rate, or consumer confidence level. In other embodiments, the econometric factors can comprise or include aggregating data series, such as number of open trades, average credit limit, and average credit card balance, at a level of geography, demographic segment, or both. In addition, the level of geography and demographic segment can vary among embodiments. For example, the level of geography may be zip code, metropolitan statistical area ("MSA"), or census region, or the demographic segment may be based on a grouping, such as income. Other various embodiments also involve the macroeconomic risk score module obtaining or determining ratios based on the econometric factors and using these ratios as independent attributes.

Also, in the various embodiments of the macroeconomic risk score module that calculates the macroeconomic risk score, the module utilizes a weighting scheme to weight data in a development sample that includes the sample of consumer credit data and the econometric factors. In one such embodiment, the macroeconomic risk score module obtains the econometric factors at a level of geography and bases the weighting scheme on the number of consumers in each level of geography so that the development sample comprises one observation per each level of geography and observation point, and each observation is given a weight equal to the number of consumers in that level of geography. In another embodiment, the macroeconomic risk score module obtains the econometric factors at a level of geography and bases the weighting scheme on building the development sample by including an observation for each consumer in each level of geography and each consumer is given an equal weight. In another embodiment, the macroeconomic risk score module bases the weighting scheme simply on the level of geography and each level of geography is weighted equally.

Lastly, various embodiments of the invention provide a computer-readable storage medium executable by a processor to determine an individual's adjusted credit risk score. These various embodiments comprise a first code memory portion executable by the processor to obtain a macroeconomic risk score, and a second code memory portion executable by the processor to determine the individual's adjusted credit risk score by obtaining the individual's credit risk score and automatically compensating the individual's credit risk score by utilizing the macroeconomic risk score.

In addition, the first code memory portion of various embodiments is further configured for execution by the processor to obtain a sample of consumer credit data over a period of time covering multiple economic conditions, to obtain a performance determination for each of the consumers in the sample over a window of time to be utilized as a dependent attribute, to obtain one or more econometric factors to be utilized as one or more independent attributes, and to calculate a macroeconomic risk score by utilizing the dependent attribute, the one or more independent attributes, and applying a statistical technique for modeling.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a graph illustrating a random sample of consumer credit data over a period of time.

FIGS. 4a and 4b are a graph illustrating individual performance over a window of time.

FIG. 5 is a graph illustrating past history of econometric factors.

FIG. 6 is a matrix incorporating both macroeconomic risk scores and custom risk scores.

DETAILED DESCRIPTION OF THE INVENTION

Figure 1:
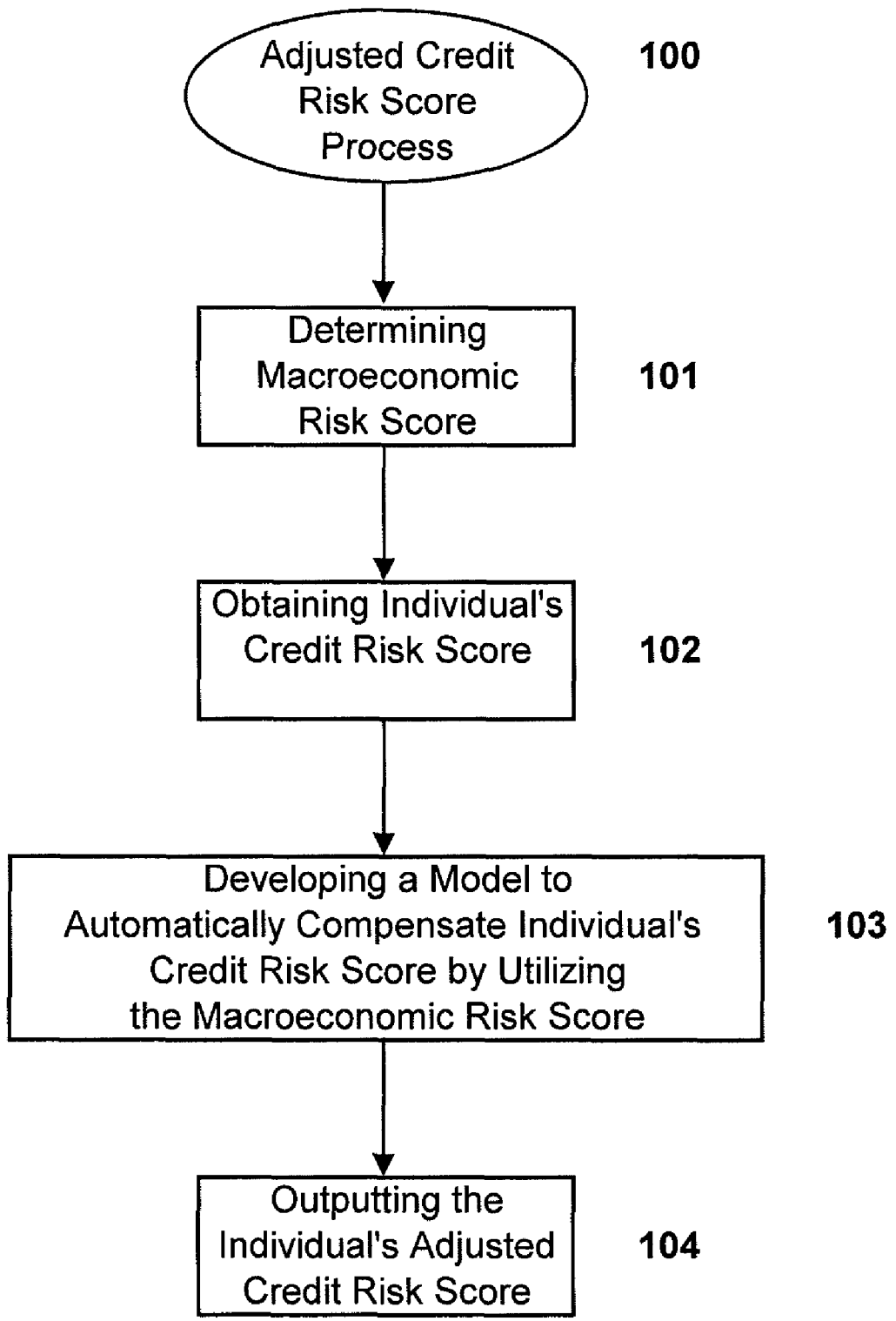
FIG. 1 is a flowchart illustrating a process to determine an adjusted credit risk score according to an embodiment of the invention.

The present invention will now be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, DVD-ROMs, USB flash drives, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Determining Adjusted Credit Risk Score

Various embodiments of the present invention provide systems and methods for determining an adjusted credit risk score. In particular, various embodiments provide systems and methods for adjusting an individual's credit risk to account for macroeconomic data. Such embodiments involve determining a macroeconomic risk score based on macroeconomic data, obtaining the individual's credit risk score, determining the individual's adjusted credit risk score by developing a model that will automatically compensate the individual's credit risk score by utilizing the macroeconomic risk score, and outputting the individual's adjusted credit risk score by utilizing the model.

Figure 2:
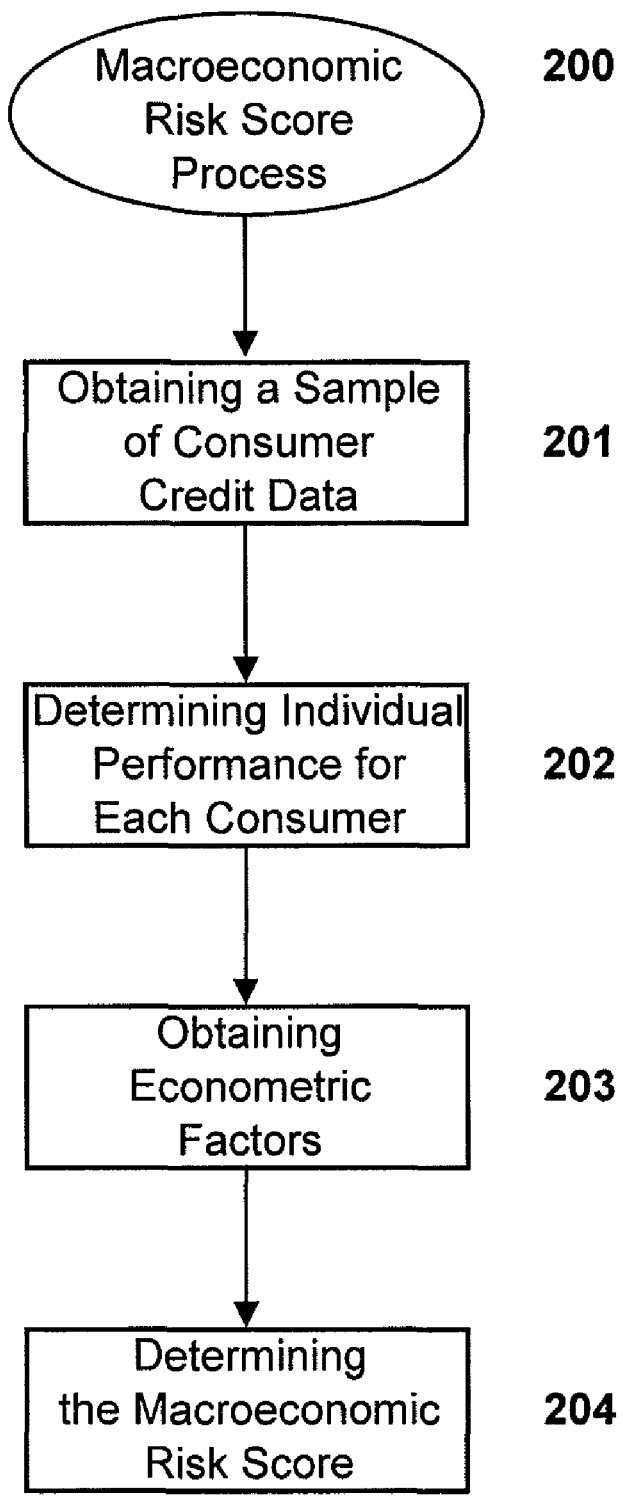
FIG. 2 is a flowchart illustrating a process to determine a macroeconomic risk score according to an embodiment of the invention.

As shown in FIG. 1, an exemplary adjusted credit risk score process 100 according to various embodiments of the invention may begin with determining a macroeconomic risk score, as shown in Step 101. This step is performed in various embodiments by developing a statistical model based on macroeconomic aggregated data. An advantage of developing such a model, as opposed to simply adjusting the individual's credit risk score by using a multiplicative factor, is that the factor is not applicable to all individuals because economic conditions, as well as current credit risk scores, can differ among levels of geography, e.g., can differ from state to state, city to city, and zip code to zip code. Thus, statistical modeling can account for this discrepancy. For example, in various embodiments, the macroeconomic risk score can be determined based on the macroeconomic risk score process 200 as shown in FIG. 2.

The first step in determining the macroeconomic risk score is obtaining a sample of consumer credit data over a period of time, covering multiple economic conditions, as shown in Step 201. In one embodiment, the sample includes a random sample of consumers, whereas in an alternative embodiment, the sample includes consumers of interest to the party who will utilize the model, such as consumers of a specific industry. The period of time may vary among embodiments as well. For instance, in one embodiment, the sample of consumer credit data encompasses quarterly samples of credit data taken over a five-year period. Thus, the sample of consumer credit data will include twenty observation points, four points for each year, as shown in FIG. 3.

In addition, the sample of consumer credit data can be obtained from various sources such as any of the credit reporting agencies that make up a part of the credit bureaus or an organization, such as a lender, may simply collect the data themselves over a time period and store the data in a database or data warehouse. As will be apparent to one of ordinary skill in the art, a sample of consumer credit data can be collected, stored, obtained, or provided in many different ways.

Next, the individual performance for each consumer in the sample of consumer credit data is determined over a window of time, as shown in Step 202. In various embodiments, typical windows are twelve (12) to twenty-four (24) months and individual performance is based on various parameters, such as whether the consumer had an account ninety (90) plus days past due during the window of time, whether the consumer had a charge-off during the window of time, or whether the consumer had a bankruptcy during the window of time. An example using twenty-four (24) month windows is shown in FIG. 4a and FIG. 4b. By the end of this step, each consumer in the sample is flagged as good or bad based on the individual performance criteria and the dependent attribute is ready for model development. In addition, some individuals may be flagged as indeterminate, for example, sixty (60) days past due on one of the individual's accounts.

In Step 203, one or more econometric factors are obtained at some level of geography or demographic segment, or both, over a period of past history, i.e., prior to the period of time the sample of consumer credit data was collected. The preferred period of past history is twenty-four (24) months, however, various periods of past history may be used in various embodiments. In addition, acceptable levels of geography may vary by country due to legal constraints or requirements. Also, acceptable use of data based on demographic segments may vary, as well, due to legal constraints or requirements.

The level of geography can range from a low level to a high level. For example, in one embodiment, the level of geography is zip code, whereas in another embodiment, the level of geography is metropolitan statistic area ("MSA") or census region. Still, in other embodiments, the level of geography can be national or international. Also, in various embodiments, demographic segments can vary and may be based on groupings such as income.

These one or more econometric factors are utilized as the independent attributes in the macroeconomic risk model used to calculate the macroeconomic risk score. In various embodiments, such factors include, but are not limited to, economic data series such as inflation rate, unemployment rate, or consumer confidence level. In addition, factors may include credit data series aggregated at the level of geography or demographic segment such as number of open trades, average credit limit, or average credit card balance. Availability of data series and econometric factors may vary by state and country based on the state of the economy and trends. Similar to the sample of consumer credit data, this data can be obtained from various sources such as purchasing the data at www.creditforecast.com, or collecting the data internally and storing the data in a database or data warehouse. In various embodiments, different ratios may be created for each series. For example, a ratio may be calculated as the inflation rate for the previous quarter over the one year average. This provides a measure of change in the economy and indicates the level of impact the econometric factor has on the model. These ratios are then used as independent attributes in the model. In various embodiments, economic factors may be trended over multiple time periods to gauge their direction and/or velocity of change. For example, the Consumer Confidence Index may be trended over four consecutive quarters, and a value for the trend's direction and the trend's velocity be calculated. These values are then used as independent attributes in the model. In various embodiments, economic factors found to be leading indicators of changes in the macroeconomic risk environment may be lagged relative to the dependent variable by different periods of time. For example, the optimal time lag for the Consumer Confidence Index may be 3 months, while the optimal time lag for inflation may be 6 months. These lagged values are then used as independent attributes in the model. By the end of Step 203, the development sample is complete and the statistical model can be constructed.

Since the dependent variable is binary, i.e., a consumer's individual performance is determined to be either good or bad, the preferred embodiment utilizes a nonlinear statistical technique, such as logistic regression, neural networks, decision trees, or score fusions. However, it is understood that nonlinear statistical techniques are not the only techniques that may be employed and that one of ordinary skill in the art may envision embodiments utilizing additional statistical techniques as appropriate for an embodiment.

In addition, in various embodiments, a weighting scheme may be utilized to give some data in the development sample more relevance in the model. The weighting scheme may comprise one or more of several different approaches. For example, in one embodiment, the approach is based on the number of consumers in each particular level of geography in which the levels of geography with the higher number of customers will have more impact over the model estimates. Thus, in this example, the development sample will keep only one observation per level of geography and observation point, and each observation will be given a weight equal to the number of consumers in that level of geography. Whereas in another embodiment, the approach is essentially equal to the example just discussed, however, the development sample is built at a consumer level as opposed to the level of geography. Yet, in another embodiment, the approach is to give each level of geography the same impact over the model estimates. One of ordinary skill in the art can conceive of numerous weighting schemes within the scope of various embodiments of the present invention. Finally, the model is developed, and at Step 204, the macroeconomic risk score is determined by utilizing the statistical model.

For example, a general macroeconomic risk score model may resemble in various embodiments:

$$\text{Macroeconomic Risk Score} = \text{Intercept} +$$
$$\text{Estimate\_1} * \text{Macroeconomic\_Independent\_Variable\_1} +$$
$$\text{Estimate\_2} * \text{Macroeconomic\_Independent\_Variable\_2} +$$
$$\vdots$$
$$\text{Estimate\_n} * \text{Macroeconomic\_Independent\_Variable\_n}.$$

To exemplify even further, the macroeconomic risk score model may resemble in various embodiments:

$$\text{Macroeconomic Risk Score} = 0.1709 + (-0.0398) * \text{Inflation Rate},$$
$$\text{average last 3 months} +$$
$$(-0.0064) * \text{Unemployment Rate},$$
$$\text{average last year} +$$
$$\vdots$$
$$0.0039 * \text{Consumer Confidence Level},$$
$$\text{previous month}.$$

Returning to FIG. 1, at Step 102, an individual's credit risk score is obtained. As previously discussed, an individual's credit risk score can be obtained through several different options, including both internal sources and external sources. For example, in an embodiment in which a reporting agency is determining the individual's adjusted credit risk score, the agency may simply use either a generic or custom credit risk score model they have developed internally to generate the individual's credit risk score. As for embodiments where a lender is determining the individual's adjusted credit risk score, a lender may obtain the score externally by purchasing the score from one of the three credit reporting agencies, or in alternative embodiment, as in the case with many large banks, a lender may obtain the score internally by calculating the score from a proprietary model built by the lender in conjunction with outside scoring formulas.

In Step 103, a model is developed to compensate an individual's credit risk score by utilizing the macroeconomic risk score. In various embodiments, an entity, such as a lender, who utilizes the score, can receive the macroeconomic risk model described above to use in a matrix with another score to represent the individual's adjusted credit risk score. For example, a lender may have the following strategy in place:

| | |
|---|---|
| Lender's Custom Risk Score <=500 | Decline Application |
| Lender's Custom Risk Score 501 to 700 | Approve Application but Assess Deposit |
| Lender's Custom Risk Score >700 | Approve Application, No Deposit Required |

If the lender decides to use both scores within a matrix, their strategy will experience the following changes as shown in FIG. 6. The result is more applicants are approved and, in addition, more applications are approved without requiring a deposit. This is accomplished without the lender sacrificing sound risk management practices (see the shaded cells in FIG. 6).

For example, two customers both have a risk score of 695. Under the old system of implementing the strategy strictly based on the individual's risk score, both consumers are approved but assessed a deposit. However, if the strategy is implemented by using the matrix discussed above, and the first customer has a macroeconomic risk score of 800 and the second customer has a macroeconomic risk score of 400, the first customer is now approved without being assessed the deposit.

In another embodiment, the lender may simply choose to receive both the macroeconomic risk score and the custom risk score and implement the decision matrix internally. In another embodiment, the matrix may be implemented at the organization providing the scores, in which case the customer will receive both the scores and the final decision.

In various other embodiments, the lender can undergo a process to alter their custom or generic risk model so that it is automatically adjusted for macroeconomic risk. Once the adjusted credit risk score model is developed, it can be implemented in a number of different ways. Such as, in one embodiment, the model is implemented at a reporting agency's site, whereas in another embodiment, the model is implemented at the lender's site. For example, the lender may be using one of the reporting agencies' models, such as a generic or custom model developed and implemented at Equifax, Inc. ("Equifax"). In this case, Equifax can select a random sample or an industry specific sample from their entire credit file to use to calculate the macroeconomic risk model. In an alternative embodiment, the lender can provide an industry specific sample to Equifax, along with the credit score to be adjusted and an individual performance indicative of the industry or specific lender. Equifax calculates the macroeconomic risk model for the sample and through a series of statistical steps develops a new model to determine the adjusted credit risk score. The statistical steps can comprise of a number of different statistical techniques, such as linear or nonlinear statistical techniques. One of ordinary skill in the art can envision that one or more of many statistical techniques may be employed.

For example, in various embodiments, Equifax may derive the macroeconomic risk model using a random sample through a series of statistical steps to give appropriate parameterization to the formula below:

Adjusted Credit Risk Score=α*Risk Score+ β*Macroeconomic Risk Score+C.

Thus after following the development process described above, the adjusted credit risk score model for a particular client (e.g., lender) of Equifax may be determined as follows:

Adjusted Credit Risk Score=0.95*Risk Score+ 0.05*Macroeconomic Risk Score+1.

Once the model is developed, an individual's adjusted credit risk score can be determined by utilizing the model, as shown in Step 104. In various embodiments, the individual's adjusted credit risk score can be used by a lender to determine whether to offer credit to an individual in the form of an automotive loan or mortgage. In one embodiment, the lender may use the adjusted credit risk score solely to make such a decision, or in another embodiment, the lender may use the adjusted credit risk score in combination with the individual's generic risk score to make the decision. One of ordinary skill in the art can envision many different uses for the individual's adjusted credit risk score.

Therefore, continuing with the example give above wherein Equifax has developed the above stated adjusted credit risk score model for a particular lender, assume by way of example that the lender receives a loan application from an applicant who lives in a geographic area experiencing a recession and the applicant's risk score is 510 and the macroeconomic risk score is 250. From using the model the applicant's macroeconomic-adjusted credit risk score is determined to be 498. Thus, if the lender has also implemented a strategy where the lender declines any applicant with a risk score less than or equal to 500 and approves any applicant with a risk score between 501 and 700 as long as the applicant provides a deposit, the lender will decline the loan application for this particular applicant. However, if the lender had not implemented the macroeconomic-adjusted credit risk score model, the applicant would have been approved as long as the applicant provided the required deposit. Thus, the lender has improved their over-all risk management by implementing the macroeconomic-adjusted credit risk score model because the model has accounted for the recession, and in turn, the lender's decision has also accounted for the recession.

System Architecture

The adjusted credit risk score system can be incorporated into a computer system of an organization, such as a credit reporting agency or a lender, in numerous ways. In one embodiment, the adjusted credit risk score system can be connected to a legacy system via a network (e.g., a LAN, the Internet or private network), whereas in another embodiment, the adjusted credit risk score system may be a stand-alone system. The adjusted credit risk system can also receive or access data and communicate in various ways. For example, in various embodiments the data is entered directly into the system either manually or via a network connection while in other embodiments the data is received or accessed by communicating either to a local or remote system such as a database, data warehouse, data system, other module, file, or storage device.

Figure 7:
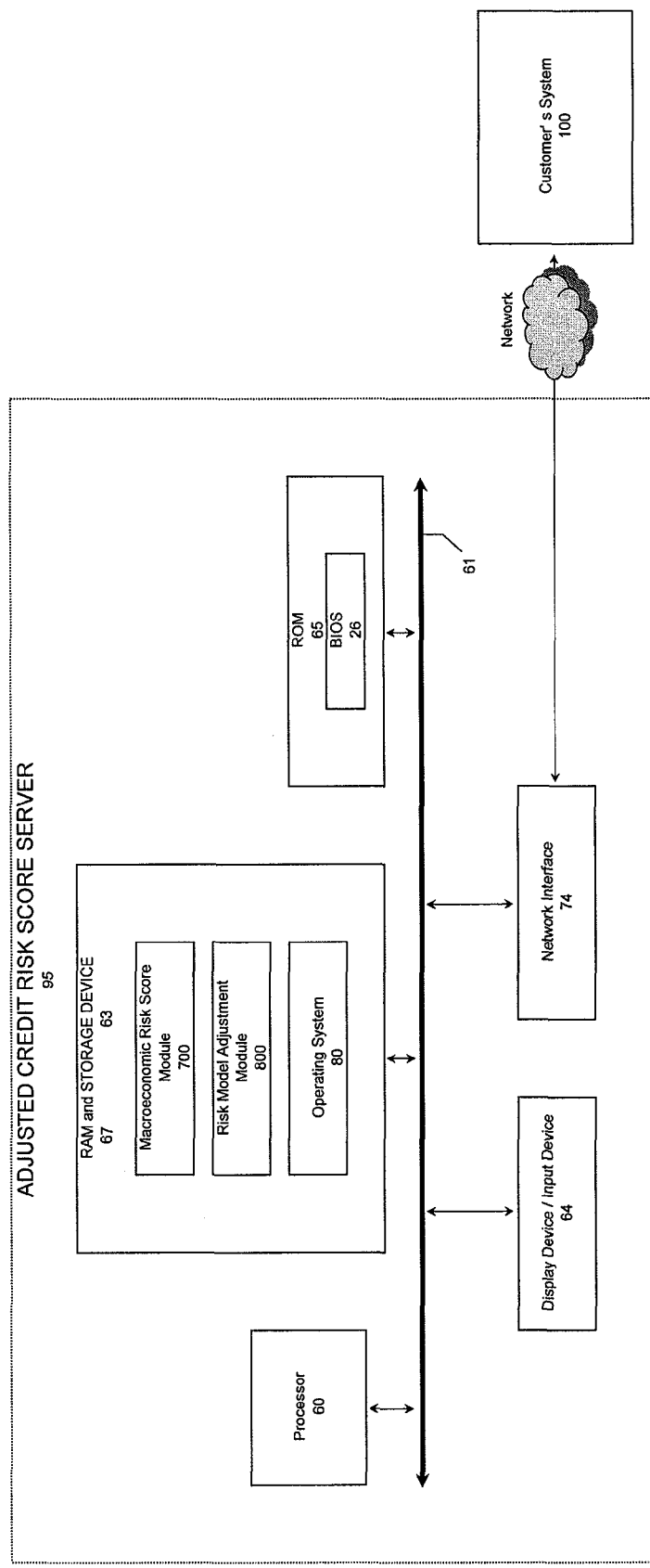
FIG. 7 is a schematic diagram illustrating an adjusted credit risk score server according to an embodiment of the invention.

FIG. 7 shows a schematic diagram of an adjusted credit risk score system 95 according to one embodiment of the invention. The adjusted credit risk score system 95 includes a processor 60 that communicates with other elements within the computer system via a system interface or bus 61. Also included in the system 95 is a display device/input device 64 for receiving and displaying data. This display device/input device 64 may be, for example, a keyboard or pointing device that is used in combination with a monitor. The system 95 further includes memory, which includes both read only memory (ROM) 65 and random access memory (RAM) 67. The system's ROM 65 is used to store a basic input/output system 26 (BIOS), containing the basic routines that help to transfer information between elements within the system 95. Alternatively, the adjusted credit risk score system 95 can operate on one computer or on multiple computers that are networked together.

In addition, the system 95 includes at least one storage device 63, such as a hard disk drive, a floppy disk drive, a CD ROM drive, a DVD ROM drive, a USB flash drive, or optical disk drive, for storing information on various computer-readable media, such as a hard disk, a removable magnetic disk, a CD-ROM disk, or a DVD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 7, program modules of the adjusted credit risk score system 95 include an operating system 80, a macroeconomic risk score module 800 and a risk model adjustment module 900. The macroeconomic risk score module 800 and the risk model adjustment module 900 control certain aspects of the operation of the adjusted credit risk score system 95, as is described in more detail below, with the assistance of the processor 60 and an operating system 80.

Also located within the system 95 is a network interface 74, for interfacing and communicating via a network (e.g., Internet or private network) with other elements of a computer network, such as a customer's system 100. It will be appreciated by one of ordinary skill in the art that one or more of the system's components 95 may be located geographically remotely from other system components. Furthermore, one or more of the components may be combined, and additional components performing functions described herein may be included in the system 95.

Macroeconomic Risk Score Module

Figure 8:
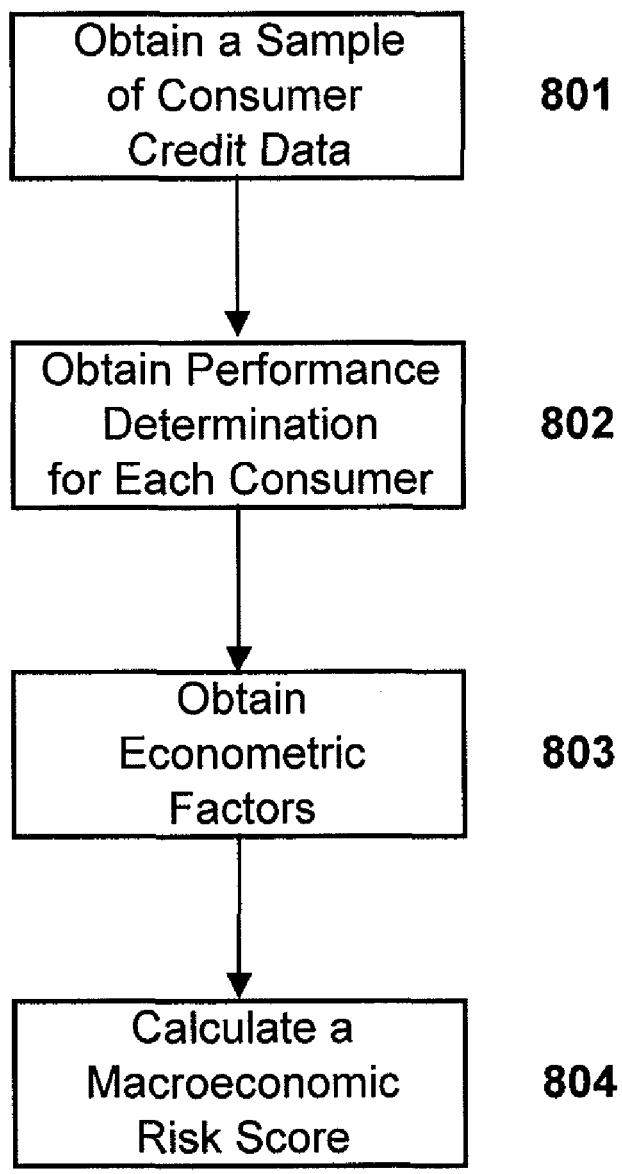
FIG. 8 is a flow diagram of a macroeconomic risk score module according to an embodiment of the invention.

FIG. 8 illustrates a flow diagram related to a macroeconomic risk score module 800 according to various embodiments of the invention. This flow diagram may correspond to the steps carried out by a processor 60 in the adjusted credit risk score system 95 shown in FIG. 7 as it executes the macroeconomic risk score module 800 in the RAM memory 67 of the system 95. Beginning at Step 801, the macroeconomic risk score module 800 obtains a sample of consumer credit data over a period of time covering multiple economic conditions. In various embodiments, the sample may be random, while in other embodiments, the sample may include consumers of interest, such as specific to an industry. The term "obtain" is used to mean receive or access. This can be accomplished either locally or remotely and may be via a communications network (e.g., a LAN, the Internet or private network).

The macroeconomic risk score module 800 can obtain the sample of consumer credit data from several different sources. In various embodiments, the macroeconomic risk score module 800 obtains the sample from one of the reporting agencies' credit file as input into the module. In other embodiments, the macroeconomic risk score module 800 queries the sample of consumer credit data from collected and stored data from an internal database, data warehouse, file, or other storage device. The period of time and economic conditions represented by the sample can vary. For example, in one embodiment, the period of time is five years, in which the economic conditions experienced were a growth, recession, and depression, and the sample of consumer credit data further includes obtaining quarterly samples of customer data over the five year period.

In Step 802, the macroeconomic risk score module 800 obtains the performance determination for each individual in the sample of consumer credit data. This may be accomplished in numerous ways, such as, in various embodiments, the macroeconomic risk score module 800 can make this determination based on logic and individual performance data collected for each individual. Specifically, the macroeconomic risk score module 800 obtains the individual performance data over a window of time. This window of time may vary among embodiments. Preferably the window of time is twelve (12) months or twenty-four (24) months. In addition, the individual performance can be represented by various parameters. In one embodiment, an individual's performance is based on whether the consumer had an account ninety (90) plus days past due during the window of time. In other embodiments, an individual's performance is based on whether the consumer had a charge-off or a bankruptcy during the window of time. One of ordinary skill in the art can envision any number of parameters that may be used to represent an individual's performance. Still in other embodiments, the macroeconomic risk score module 800 may simply obtain the performance determination for each individual in the sample of consumer credit data directly from a database, a data warehouse, a file, another module, other storage device, or external source. At this point, each individual in the sample of consumer credit data will be "flagged" as good or bad, i.e., performance determination.

In Step 803, the macroeconomic risk score module 800 obtains one or more econometric factors at a level of geography or demographic segment, or both, for a period of past history prior to the period of time the sample of consumer credit data was collected. Preferably, the period of past history is twenty-four months, however, various embodiments may use various periods of past history. In addition, in various embodiments, the consumer credit data and econometric factors may be obtained simultaneously or sequentially. As mentioned previously, acceptable levels of geography and acceptable use of data based on demographic segments may vary due to different legal constraints and/or requirements. In addition, the level of geography and demographic segment will vary among embodiments based on the user's preference. In various embodiments, the level of geography can be at a low level such as zip code, MSA, or census region. In other embodiments, the level of geography can be at a high level such as national or international. In turn, in various embodiments, the demographic segment may be based on such groupings as income.

As previously mentioned, these one or more econometric factors are utilized as the independent attributes in the macroeconomic risk model used to calculate the macroeconomic risk score. In addition, econometric factors may vary among different embodiments as well. For example, various embodiments will obtain economic data series such as inflation rate, unemployment rate, or consumer confidence level. While other embodiments will obtain credit data series aggregated at the level of geography or demographic segment such as number of open trades, average credit limit, or average credit card balance. One of ordinary skill in the art can utilize a number of different economic data for this purpose.

The macroeconomic risk score module 800 can obtain the economic data from various government or private industry sources. For example, one embodiment obtains the economic data by purchasing the data over the Internet from a private industry source, such as www.creditforecast.com, and loading the data into the macroeconomic risk score module 800 or other storage device such as a database, data warehouse, or file. Another embodiment collects the economic data internally and the macroeconomic risk score module 800 obtains the data from a database, a data warehouse, a file, another module, or other storage device.

In addition, different ratios may be determined or provided for each series in various embodiments. For example, a ratio may be determined by inflation rate for the previous quarter over the one year average. As mentioned above, this provides a measure of change in the economy and indicates the level of impact the econometric factor will have on the model. These ratios are then used as independent attributes in the model. In various embodiments, the macroeconomic risk score module 800 can determine these ratios or, in alternative embodiments, the module 800 can obtain the ratios from various sources such as a database, a data warehouse, a file, another module, other storage device, or external source. By the end of Step 803, the macroeconomic risk score module will have a development sample that is complete and ready for modeling.

In various embodiments, the macroeconomic risk score module 800 may also apply a weighting scheme. As mentioned previously, a weighting scheme is used to give more relevance to certain data in the development sample. In one embodiment, the weighting scheme is based on the number of consumers in each level of geography. In this embodiment, the development sample will keep only one observation per level of geography and observation point, and each observation is given a weight equal to the number of consumers. In an alternative embodiment, the weighting scheme is essentially equal to the scheme previously discussed, except, the development sample will be built at a consumer level instead at the level of geography. Yet, in another embodiment, the development sample is built at the level of geography and each level of geography will have the same impact over the model estimates. One of ordinary skill in the art can utilize various different weighting schemes.

In various embodiments, the macroeconomic risk score module 800 can apply the weighting scheme via source code. However, in alternative embodiments, the weighting scheme can be applied in a more dynamic structure such as utilizing an interface so that the user can define or choose a weighting scheme or by utilizing a database where the weighting scheme is defined via table(s).

The macroeconomic risk score module 800 then calculates the macroeconomic risk score by utilizing a statistical method to determine a model, as shown in Step 804. This can be accomplished in a number of ways. In various embodiments, the macroeconomic risk score module 800 is programmed to perform a statistical method on the development sample in order to determine a model to calculate a macroeconomic risk score. Since the dependent variable, i.e., the consumer's risk determination, is binary, i.e., good or bad, the preferred embodiment will utilize a nonlinear statistical technique, such as logistic regression, neural networks, decision trees, and score fusions. However, it is understood that various other statistical techniques may be employed and that one of ordinary skill in the art may envision embodiments utilizing these techniques.

In various embodiments, the macroeconomic risk score module 800 can use a commercial software package, such as SAS® software (registered trademark of SAS Institute, Cary, N.C.), SPSS® (registered trademark of SPSS, Inc., Chicago, Ill.), or S-Plus (registered trademark of Insightful Corp., Seattle, Wash.) to determine the model. The commercial software can be incorporated into the user's system internally or can be utilized via a communications network (e.g., a LAN, the Internet or private network). In addition, various embodiments may include an interface so that the user may choose the statistical method to use. This provides for greater flexibility in the system 95.

Once the model has been developed, the macroeconomic risk score module 800 can provide a macroeconomic risk score that can be utilized in determining an individual's adjusted credit risk score. Specific details on determining an individual's adjusted credit score are discussed below.

Risk Model Adjustment Module

Figure 9:
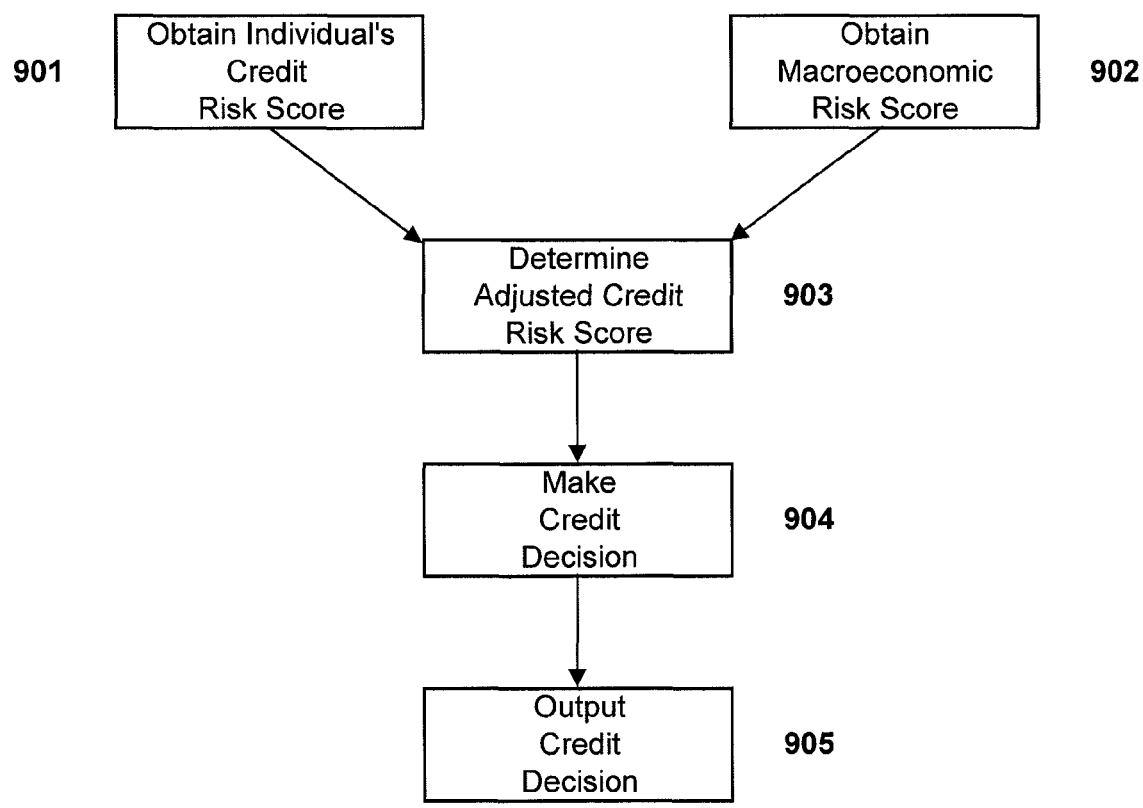
FIG. 9 is a flow diagram of a risk model adjustment module according to an embodiment of the invention.

FIG. 9 illustrates a flow diagram of a risk model adjustment module 900 according to various embodiments of the invention. This flow diagram may correspond to the steps carried out by a processor 60 in the adjusted risk score system 95 shown in FIG. 7 as it executes the risk model adjustment module 900 in the system's 95 RAM memory 67. The macroeconomic risk score module 900 obtains the individual's credit risk score in Step 901 and the macroeconomic risk score in Step 902. In various embodiments, the two scores may be obtained simultaneously or sequentially.

In addition, as will be apparent to one of ordinary skill in the art, the individual's credit risk score and macroeconomic risk score can be obtained in various embodiments from numerous sources. Further, in various embodiments, the risk model adjustment module 900 can obtain either score from one of the three credit bureaus or from an internal model. For example, in one embodiment, the risk model adjustment module 900 obtains the macroeconomic risk score from the macroeconomic risk score module 800. In another embodiment, the risk model adjustment module 900 is linked to a credit reporting agency via the Internet or local network and obtains the macroeconomic risk score directly from the agency. In other embodiments, the risk model adjustment module 900 can obtain the scores from a database, a data warehouse, a file, another module, or other storage device.

In Step 903, the individual's adjusted credit risk score is determined. In various embodiments, the risk model adjustment module 900 can use the individual's credit risk score and the macroeconomic risk score in conjunction with a matrix to represent the individual's adjusted credit risk score, such as the one previously discussed. In one embodiment, the matrix can be coded as logic directly into the module 900. In other embodiments, the matrix can be incorporated dynamically by using a database and an interface. The matrix is stored in table(s) within the database and the interface can be used to update the values in the matrix. In other embodiments, the risk model adjustment module 900 alters the custom or generic credit risk model so that it is automatically adjusted for macroeconomic risk. As discussed above in conjunction with the macroeconomic risk score module 800, the statistical steps can comprise of a number of different statistical techniques, such as linear or nonlinear statistical techniques. One of ordinary skill in the art can envision many statistical techniques that can be employed.

The adjusted risk score system 95 can be implemented in a number of different ways to produce the adjusted credit risk score. For example, in one embodiment, the system 95 is accessed via a web site by a user or third party. The user visits the web site, requests the individual's adjusted credit risk score, and the score is returned to the user. In other embodiments, a user's system is tied into the adjusted credit risk system 95 so that once a request for an individual's credit risk score is made, the score is obtained directly into the user's system. For example, the adjusted credit risk score system 95 can be located at Equifax and a lender's underwriting system is connected directly to the Equifax system via a communications network (e.g., Internet or local network). When the lender's employee runs the underwriting system for an individual's loan application, the lender's underwriting system sends a typical credit inquiry and requests the individual's adjusted credit risk score directly via the link to Equifax's adjusted credit risk system. A single three-byte score is returned that is the calculated adjusted risk score in the requested format. In other embodiments, lenders may implement the adjusted credit risk score system 95 internally.

The adjusted risk score may be presented in a variety of ways as well. For example, in various embodiments it may be sent in a print image or system image. A print image may comprise the three-digit risk credit score listed along with the adverse action codes and the credit history. A system image may comprise a stream of data in which the adjusted credit risk score can be "picked out" of with an application processing system ("APS") layer so that a user can access the score and display it in whatever fashion they want. The user can be a third-party vendor, a customer, or a credit bureau, such as Equifax, utilizing enabling technology, such as InterConnect or Decision Power. In various embodiments, the adjusted risk score may be stored in and accessed from current or historical archive versions of consumer credit records, such as the "offline" credit database archives maintained by Equifax. Adjusted risk scores stored and accessed thusly could be used by financial institutions or other entities, for example, within their prescreen marketing, portfolio monitoring, or account management functions. In various embodiments, the adjusted score and pre-adjusted score are presented, while in other embodiments; only the adjusted score is presented and used. It will be apparent to one of ordinary skill in the art that the adjusted risk score may be presented in a variety of different ways, as well as, obtained in a variety of different ways.

In addition to determining the adjusted risk score, the risk model adjustment module 900 of various embodiments of the invention may also make a credit decision based on the adjusted credit risk score, as shown in Step 904. This decision can be based on various criteria, such as for example: declining the application if the adjusted credit risk score is less than or equal to 500; approving the application but assessing a deposit if the adjusted credit risk score is 501 to 700; and approving the application without a deposit if the adjusted credit risk score is greater than 700. The criteria can be incorporated into the system 95 through various methods. For example, in one embodiment, the criteria are hard coded into the logic of the risk model adjustment module 900. In another embodiment, the criteria are stored in a database and the risk model adjustment module 900 obtains the criteria from the database. This allows the criteria to be more easily changed by simply editing a record or records in a table or tables of the database. In other embodiments, the criteria are simply stored in various devices such as a file, another module, or data warehouse. One of ordinary skill in the art can envision numerous ways to incorporate the criteria into the system 95.

In addition, the risk model adjustment module 900 of several embodiments may also output the credit decision, as shown in Step 905. This decision can be output independent of the adjusted credit risk score or in addition to the adjusted credit risk score. It will be apparent to one of ordinary skill in the art that the credit decision may be presented in a variety of different ways, as well as, obtained in a variety of different ways. For example, the credit decision may be sent in a print image or system image in various embodiments in the same fashion as the adjusted risk score is sent as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for determining a macroeconomic risk score used for adjusting an individual's credit risk score, said method comprising the steps of:
   a) obtaining a sample of consumer credit data stored in memory, said sample of consumer credit data comprising credit data associated with a plurality of consumers over a first period of time covering one or more economic conditions;
   b) determining performance for each consumer represented in said sample of consumer credit data, via one or more computing devices, based on each consumer's financial history reflected in said sample of consumer credit data, wherein said consumer's performance is utilized as a dependent attribute;
   c) obtaining data of one or more econometric factors associated with macroeconomics stored in said memory, said data of one or more econometric factors comprising data of said one or more econometric factors over a second period of time prior to said first period of time, wherein said one or more econometric factors are utilized as one or more independent attributes; and
   d) determining said macroeconomic risk score, via said one or more computing devices, by utilizing said dependent attribute, said one or more independent attributes, and applying a statistical technique for modeling, wherein said macroeconomic risk score reflects an effect of macroeconomic changes on said individual's credit risk score.

2. The method of claim 1, further comprising the steps of:
   e) obtaining said individual's credit risk score stored in said memory;
   f) developing a model implemented by said one or more computing devices that automatically compensates said individual's credit risk score by adjusting said individual's credit risk score based on said macroeconomic risk score; and
   g) outputting an adjusted credit risk score for said individual by utilizing said model.

3. The method of claim 2, further comprising the step of:
   h) offering credit to said individual based on said individual's adjusted credit risk score.

4. The method of claim 2, wherein said model comprises a matrix comprising macroeconomic risk scores and unadjusted credit risk scores.

5. The method of claim 2, wherein said model is developed via a statistical technique.

6. The method of claim 1, wherein said econometric factors comprise at least one data series selected from the group consisting of an inflation rate, an unemployment rate, or a consumer confidence level, or combinations thereof.

7. The method of claim 1, wherein said econometric factors comprise at least one data series aggregated at a level of geography or a demographic segment, or both, said data series selected from the group consisting of a number of open trades, an average credit limit, or an average credit card balance, or combinations thereof.

8. The method of claim 1, wherein said econometric factors are obtained at a level of geography.

9. The method of claim 1, wherein said statistical technique is a nonlinear statistical technique.

10. The method of claim 1, wherein a weighting scheme is utilized to weight data in a development sample that includes said sample of consumer credit data and said econometric factors.

11. The method of claim 10, wherein said econometric factors are obtained at a level of geography and said weighting scheme is based on a number of consumers in each of said level of geography so that said development sample comprises one observation per each said level of geography and an observation point, and each said observation is given a weight equal to said number of consumers in that said level of geography.

12. The method of claim 10, wherein said econometric factors are obtained at a level of geography and said weighting scheme is based on building said development sample by including an observation for each consumer in each said level of geography and each said consumer is given an equal weight.

13. The method of claim 10, wherein said weighting scheme is based on said level of geography and each of said level of geography is weighted equally.

14. A system for determining a macroeconomic risk score, said system comprising:
   a processor adapted to execute a macroeconomic risk score module; and
   a memory coupled to said processor and adapted for storing said macroeconomic risk score module, wherein:
      said macroeconomic risk score module is adapted for execution by the processor to:
         obtain a sample of consumer credit data comprising credit data associated with a plurality of consumers over a first period of time covering one or more economic conditions;
         obtain a performance determination for each of said consumers in said sample of consumer credit data based on each consumer's financial history reflected in said sample to be utilized as a dependent attribute;
         obtain data of one or more econometric factors associated with macroeconomics to be utilized as one or more independent attributes, said data comprising data of said one or more econometric factors over a second period of time prior to said first period of time; and
         calculate a macroeconomic risk score by utilizing said dependent attribute, said one or more independent attributes, and applying a statistical technique for modeling, wherein said macroeconomic risk score reflects an effect of macroeconomic chances on an individual's credit risk score.

15. The system of claim 14, wherein the processor is further adapted to execute a risk model adjustment module, said risk model adjustment module is adapted for execution by the processor to determine an adjusted credit risk score for said individual by obtaining said individual's credit risk score and automatically compensating said individual's credit risk score by adjusting said individual's credit risk score based on said macroeconomic risk score.

16. The system of claim 15, wherein said risk model adjustment module determines said individual's adjusted credit risk score based on a matrix comprised of macroeconomic risk scores and credit risk scores.

17. The system of claim 15, wherein said risk model adjustment module determines said individual's adjusted credit risk score based on a model developed via a statistical technique.

18. The system of claim 15, wherein said risk model adjustment module is further adapted to determine whether to offer credit to said individual based on said individual's adjusted credit risk score.

19. The system of claim 18, wherein said risk model adjustment module is further adapted to output said determination as to whether to offer credit to said individual.

20. A computer-readable storage medium executable by a processor to determine a macroeconomic risk score, said computer-readable storage medium comprising:
   a first code memory portion executable by said processor to:
      obtain a sample of consumer credit data comprising credit data associated with a plurality of consumers over a first period of time covering one or more economic conditions;
      obtain a performance determination for each of said consumers in said sample of consumer credit data based on each consumer's financial history reflected in said sample to be utilized as a dependent attribute;
      obtain data of one or more econometric factors associated with macroeconomics to be utilized as one or more independent attributes, said data comprising data of said one or more econometric factors over a second period of time prior to said first period of time; and
      calculate a macroeconomic risk score by utilizing said dependent attribute, said one or more independent attributes, and applying a statistical technique for modeling, wherein said macroeconomic risk score reflects an effect of macroeconomic chances on an individual's credit risk score.

21. The computer-readable storage medium of claim 20 comprising:
   a second code memory portion executable by said processor to determine an adjusted credit risk score for said individual by obtaining said individual's credit risk score and automatically compensating said individual's credit risk score by adjusting said individual's credit risk score based on said macroeconomic risk score.

22. A computer-implemented method for determining an adjusted credit risk score for an individual, said method comprising, by one or more computing devices, automatically adjusting said individual's credit risk score by applying a model based on a macroeconomic risk score, wherein said macroeconomic risk score is derived by:
   a) obtaining a sample of consumer credit data, said sample of consumer credit data comprising credit data associated with a plurality of consumers over a first period of time covering one or more economic conditions;
   b) determining individual performance for each consumer represented in said sample of consumer credit data based on each consumer's financial history reflected in said sample of consumer credit data, wherein said individual performance is utilized as a dependent attribute;
   c) obtaining data of one or more econometric factors associated with macroeconomics, said data of one or more econometric factors comprising data of said one or more econometric factors over a second period of time prior to said first period of time, wherein said one or more econometric factors are utilized as one or more independent attributes; and
   d) determining said macroeconomic risk score by utilizing said dependent attribute, said one or more independent attributes, and applying a statistical technique for modeling.

* * * * *

UNITED STATES PATENT AND TRADEMARK OFFICE
CERTIFICATE OF CORRECTION

| | | |
|---|---|---|
| PATENT NO. | : 8,024,263 B2 | |
| APPLICATION NO. | : 12/689288 | |
| DATED | : September 20, 2011 | |
| INVENTOR(S) | : Zarikian et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

This patent is subject to a terminal disclaimer.--

Column 18
Line 60, "chances" should read --changes--

Column 20
Line 2, "chances" should read --changes--

Signed and Sealed this
Twenty-seventh Day of March, 2012

David J. Kappos
*Director of the United States Patent and Trademark Office*